United States Patent
Mennekens (10) Patent No.: US 11,774,538 B2
(45) Date of Patent: Oct. 3, 2023

(54) METHODS AND DEVICES FOR TRANSMITTING A BIT SEQUENCE AND ESTIMATING THE ARRIVAL TIME OF SAME

(71) Applicant: UWINLOC, Toulouse (FR)

(72) Inventor: Jan Mennekens, Péguilhan (FR)

(73) Assignee: UWINLOC, Toulouse (FR)

( * ) Notice: Subject to any disclaimer, the term of this patent is extended or adjusted under 35 U.S.C. 154(b) by 212 days.

(21) Appl. No.: 17/414,716

(22) PCT Filed: Dec. 18, 2019

(86) PCT No.: PCT/EP2019/085969
§ 371 (c)(1),
(2) Date: Jun. 16, 2021

(87) PCT Pub. No.: WO2020/127496
PCT Pub. Date: Jun. 25, 2020

(65) Prior Publication Data
US 2022/0349983 A1 Nov. 3, 2022

(30) Foreign Application Priority Data
Dec. 19, 2018 (FR) .................................... 1873387

(51) Int. Cl.
*G01S 1/04* (2006.01)
*G01S 5/06* (2006.01)
(52) U.S. Cl.
CPC ............ *G01S 1/0428* (2019.08); *G01S 1/042* (2013.01); *G01S 5/06* (2013.01)

(58) Field of Classification Search
CPC .............................. G01S 1/0428; G01S 1/042
See application file for complete search history.

(56) References Cited

U.S. PATENT DOCUMENTS

2004/0190597 A1 9/2004 Cowie et al.
2010/0278214 A1 11/2010 Westcott et al.

FOREIGN PATENT DOCUMENTS

FR  3 058 226 A1     5/2018
GB  2576054 A  *  2/2020  ........... H04L 27/261

OTHER PUBLICATIONS

International Search Report as issued in International Patent Application No. PCT/EP2019/085969, dated Mar. 6, 2020.

* cited by examiner

*Primary Examiner* — Gregory C. Issing
(74) *Attorney, Agent, or Firm* — Pillsbury Winthrop Shaw Pittman LLP (57) ABSTRACT

A method for transmitting a bit sequence to be transmitted at a frequency $f_b$. A set of codes is determined in advance, wherein each code is associated with a possible value from a block of $N_b$ bits, and each code includes an ordered set of $N_s$ binary symbols intended to be transmitted at a frequency $f_s$. The method includes splitting the bit sequence into N blocks of $N_b$ bits, the frequency $f_s$ and the numbers N and $N_b$ being selected such that $N_s \times f_b = N \times N_b \times f_s$, associating a code with each of the N blocks according to the value from the blocks, interleaving the binary symbols of the N codes respectively corresponding to the N blocks of bits to be transmitted, the interleaved binary symbols being transmitted at a frequency $f_c$ such that $N \times f_s = f_c$.

5 Claims, 5 Drawing Sheets

| Val | Code |
|---|---|
| 0000 | Code #1 |
| 0001 | Inverse code #1 |
| 0010 | Code #2 |
| 0011 | Inverse code #2 |
| 0100 | Code #3 |
| 0101 | Inverse code #3 |
| 0110 | Code #4 |
| 0111 | Inverse code #4 |
| 1000 | Code #5 |
| 1001 | Inverse code #5 |
| 1010 | Code #6 |
| 1011 | Inverse code #6 |
| 1100 | Code #7 |
| 1101 | Inverse code #7 |
| 1110 | Code #8 |
| 1111 | Inverse code #8 |

METHODS AND DEVICES FOR TRANSMITTING A BIT SEQUENCE AND ESTIMATING THE ARRIVAL TIME OF SAME

CROSS-REFERENCE TO RELATED APPLICATIONS

This application is the U.S. National Stage of PCT/EP2019/085969, filed Dec. 18, 2019, which in turn claims priority to French patent application number 1873387 filed Dec. 19, 2018. The content of these applications are incorporated herein by reference in their entireties.

FIELD OF THE INVENTION

The present invention is particularly well suited to the field of geolocating a transmitting device of a wireless communication system. In particular, the invention relates to a method for transmitting a message by such a transmitting device, as well as a method for estimating the arrival time of such a message by a receiving device of the wireless communication system.

PRIOR ART

The present invention has a particularly advantageous application, although not limiting in any way, in the systems for geolocating a transmitting device of a wireless communication system.

The radio signal transmitted to the beacons generally transports a message corresponding to an identifier of the label.

Each beacon that receives the message transmitted by the label then estimates an arrival time of the message. Through methods called "Time Difference Of Arrival" (TDOA), a server that collects all the arrival times estimated by the different beacons, and that knows the geographical positions of said beacons, is then able to estimate the geographical position of the label.

The precision of the estimation of the geographical position of the label depends on the precision of the estimation of the arrival time of the message by each beacon.

It is known to encode a message in the form of a bit sequence and to modulate each bit to be transmitted with a pseudo-noise code. This modulation of the signal to be transmitted with a pseudo-noise signal of a higher frequency is known under the name of "Direct-Sequence Spread Spectrum" (DSSS).

To decode a message received from a label, a beacon can proceed with sampling the signal received and with calculating correlation values of the signal received with a reference signal from samples of the signal.

A correlation peak of which the value is greater than a predetermined threshold generally corresponds to the detection of a message. It is then possible to estimate the arrival time of the message according to the time of the correlation peak.

The precision of the estimation of an arrival time of a message then depends on the sampling frequency of the signal received: the higher the sampling frequency is, the higher the precision of the estimation of the arrival time is. However, the increase in the sampling frequency is necessarily limited, whether for reasons of cost, energy consumption, and even technological developments.

On the other hand in such a system, the constraints in terms of energy consumption of the label are particularly high. It is indeed suitable to limit the transmission duration of a message in order to reduce the time during which the label is active. On the other hand, for a fixed transmission duration of a message, it is suitable to limit the energy required to transmit said message.

It appears that the solutions known from the prior art for implementing such a system for geolocating can still be improved, whether at the level of the consumption of electrical energy required for the transmission of a message or at the level of the precision of the estimation of the arrival time of a message.

DISCLOSURE OF THE INVENTION

The present invention has for objective to overcome all or a portion of the disadvantages of the prior art, in particular those mentioned hereinabove, by proposing a solution that makes it possible on the one hand to reduce the electrical consumption of a transmitting device during the transmission of a message, and on the other hand to optimize the decoding of the message and the precision of the estimation of the arrival time of the message at a receiving device.

In the rest of the description, it is considered that a message corresponds to a bit sequence, or to several concatenated bit sequences of the same length (with padding bits able to be used in the case where the number of bits coding the useful information is not a multiple of the length of a bit sequence).

In the case where a message is formed by several concatenated bit sequences, the transmission of a message corresponds to the successive transmission of all the bit sequences that form the message. The detection of the arrival time of a message corresponds to the detection of the arrival time of the first bit sequence that forms the message.

According to a first aspect, the present invention proposes a method for transmitting a bit sequence to be transmitted at a frequency $f_b$. For this method, a set of codes was determined in advance, wherein each code is associated with a possible value from a block of $N_b$ bits, and each code comprises an ordered set of $N_s$ binary symbols intended to be transmitted at a frequency $f_s$. The method comprises:
  splitting the bit sequence into N blocks of $N_b$ bits, said blocks being ordered according to a predetermined order of transmission, the frequency $f_s$ and the numbers N and $N_b$ being selected such that $N_s \times f_b = N \times N_b \times f_s$,
  associating a code with each of the N blocks according to the value from the blocks,
  interleaving the binary symbols of the N codes respectively corresponding to the N blocks of bits to be transmitted, the interleaved binary symbols being transmitted successively over time with a frequency $f_c$ such that $N \times f_s = f_c$.

It thus appears that the interleaved symbols are transmitted at a frequency $f_c$ N times higher than the frequency $f_s$ at which the symbols would be transmitted without interleaving ($f_s$ is the frequency of the symbols of a code).

The numbers N, $N_s$ and $N_b$ are positive integers. Preferably, the number $N_b$ of bits in each block is greater than or equal to two.

Such arrangements make it possible to increase the transmission speed and consequently to reduce the time required to transmit a message. This thus makes it possible to reduce the electrical consumption of a transmitting device implementing such a method. In addition, the global noise for a system that implements several such transmitting devices is reduced.

Furthermore, the method for transmitting a bit sequence according to the invention makes it possible to optimize the detection and the precision of the estimation of the arrival time of the bit sequence at a receiving device.

In particular embodiments, the invention can further comprise one or more of the following characteristics, taken individually or in any technically permissible combination.

In particular embodiments, the set of codes associated with the possible values from a block of $N_b$ bits comprises $2^{(N_b-1)}$ main codes as well as the $2^{(N_b-1)}$ respective inverse codes. A binary symbol of an inverse code has a state contrary to a state of the binary symbol of the same rank of the respective main code.

Such arrangements make it possible to divide by two the number of correlation calculations to be carried out at a receiving device to decode the bit sequence.

In particular embodiments, the inverse code to the code normally associated with the value from a block of bits is used to encode at least one predetermined block of bits of the sequence of bits to be transmitted.

In particular embodiments, the inverse code is used in place of the code normally associated with the value from a block of bits for one block of bits out of two of the sequence of bits to be transmitted.

Such arrangements make it possible in particular to reduce the symmetry of the binary symbols transmitted when several blocks that have the same value have to be transmitted successively.

In particular embodiments, the signal used to transmit the binary symbols is an ultra wide band signal of the "on off" type. The two possible states of a binary symbol then correspond respectively to a presence or an absence of a pulse.

In particular embodiments, the determined codes have a two-by-two inter-correlation level less than 30% of $N_s$.

Such arrangements make it possible to optimize the decoding of the bit sequence at a receiving device for which the bit sequence transmitted is intended.

According to a second aspect, the present invention relates to a transmitting device implementing a method for transmitting a bit sequence according to any of the embodiments hereinabove.

According to a third aspect, the present invention relates to a method for estimating the arrival time of a bit sequence. The bit sequence is transmitted according to a method corresponding to any of the embodiments hereinabove. For each code of a portion at least of the set of codes associated with a possible value from a block of $N_b$ bits, a correlation calculation is carried out between the signal transporting the bit sequence and a reference signal representative of said code. The arrival time of the bit sequence is determined according to N respective detection times of N correlation peaks corresponding to the N different blocks of bits transmitted.

Such arrangements make it possible to optimize the detection of a correlation peak and the precision of the estimation of the arrival time of the bit sequence at a receiving device.

According to a fourth aspect, the present invention relates to a receiving device implementing a method for estimating the arrival time of a bit sequence according to any of the embodiments hereinabove.

According to a fifth aspect, the present invention relates to a system for geolocating a transmitting device according to any of the embodiments hereinabove. The system comprises a plurality of receiving devices according to any of the embodiments hereinabove.

According to a sixth aspect, the present invention relates to such a system for geolocating wherein a transmitting device is a label intended to be affixed on an object to be geolocated, and a receiving device is a beacon that generates an electromagnetic field to supply a label with energy. The system for geolocating furthermore includes a server that collects the arrival times of a message transmitted by a label estimated by the different beacons, and which estimates the geographical position of said label according to the estimated arrival times and geographical positions of the different beacons.

PRESENTATION OF THE FIGURES

The invention shall be understood better when reading the following description, given as an example that is in no way limiting, and given in reference to FIGS. 1 to 9 which show.

In these figures, identical references from one figure to another designate identical or similar elements. For reasons of clarity, the elements shown are not necessary at the same scale, unless mentioned otherwise.

DETAILED DESCRIPTION OF AN EMBODIMENT OF THE INVENTION

Such as indicated hereinabove, the present invention aims to propose a solution that makes it possible in particular to reduce the electrical consumption of a transmitting device during the transmission of a message, as well as optimize the decoding of the message and the precision of the estimation of the arrival time of the message at a receiving device. Another advantage of the solution proposed is to increase the transmission speed of the message.

In the rest of the description, the case of a system for geolocating a transmitting device of a wireless communication system is covered in a non-limiting manner. Nothing however prevents the invention from having an application in another field, when a message that has the form of one or more sequences of bits has to be transmitted by a transmitting device.

Figure 1:
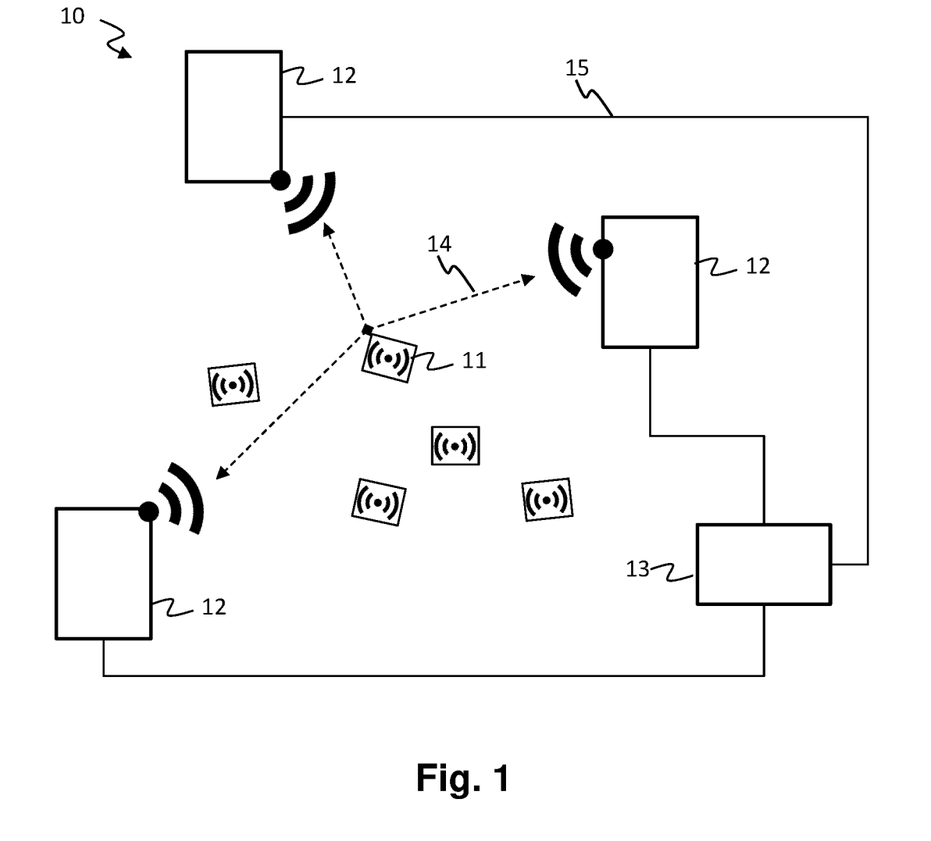
FIG. 1 diagrammatically shows a system for geolocating a transmitting device.

FIG. 1 diagrammatically shows such a system 10 for geolocating.

The system 10 for geolocating comprises at least one transmitting device 11, a plurality of receiving devices 12, as well as a server 13 connected to the different receiving devices.

A message is transmitted by a transmitting device 11 to each receiving device 12 in the form of a radio signal conveyed over a wireless communication link 14.

The term "radio signal" means an electromagnetic wave propagating via wireless means, of which the frequencies are comprised in the conventional spectrum of radioelectric waves (a few hertz to several hundred gigahertz).

The transmitting device 11 comprises means of wireless communication, considered as known to those skilled in the art, allowing the transmitting device 11 to transmit messages in the form of radioelectric signals to receiving devices 12 of the system 10 for geolocating. Such means can in particular comprise a processor, a local oscillator, analogue and/or digital filters, a digital-to-analogue converter, a power amplifier, an antenna, etc.

Similarly, the receiving device 12 comprises wireless means of communication, considered as known to those skilled in the art, allowing the receiving device 12 to receive a message from a transmitting device 11 in the form of radioelectric signals. Such means can in particular include a processor, a local oscillator, analogue and/or digital filters, an analogue-to-digital converter, a low-noise amplifier, an antenna, a demodulator, a correlator, etc.

A communication link 15 between a receiving device 12 and the server 13 can be a wired communication link or a wireless communication link.

In the rest of the description, the non-limiting case shall be used where a transmitting device 11 of the system 10 for geolocating is a label that comprises a battery that is charged from the energy coming from surrounding electromagnetic fields to transmit a radio signal to receiving devices 12, referred to as "beacons", positioned inside a hangar. In particular embodiments, the electromagnetic fields that make it possible to charge the battery of the label are generated by the beacons themselves.

The radio signal transmitted to the beacons transports for example a message corresponding to an identifier of the label.

The electrical energy consumption of the label to transmit a message depends on the transmission duration of the message. Indeed, the shorter the transmission duration of a message is, the shorter the period of time during which the label has to be in an active mode in order to transmit the message is, and the more reduced the electrical consumption of the label is.

Each beacon that receives the message transmitted by the label then estimates an arrival time of the message.

The server 13 collects all the arrival times estimated by the different beacons. Furthermore, the server 13 knows the geographical positions of said beacons.

Through so-called "Time Difference Of Arrival" (TDOA) methods, the server 13 is then able to estimate the geographical position of the label.

The precision of the estimation of the geographical position of the label depends on the precision of the estimation of the arrival time of the message by each beacon.

In the rest of the description, the non-limiting case shall be used where the radio signal transmitted by a label of the system 10 for geolocating is an ultra wide band signal.

The term Ultra Wide Band (also designated by the acronym UWB) refers to radioelectric signals that have a frequency spectrum greater than 500 megahertz at −10 dB with respect to the maximum power of said instantaneous frequency spectrum, or radioelectric signals that have a bandwidth to central frequency ratio of 20% or more.

A UWB signal generally has very short radio pulses of about a nanosecond or a few nanoseconds. The very low duration of these radio pulses has for consequence that the UWB signal has a very wide bandwidth with a relatively low power spectral density. Because of this relatively low power spectral density, the UWB signals can share the radio spectrum with radio signals from other communication systems with a narrower band without causing any interference problems.

Furthermore, a UWB signal is relatively insensitive to the phenomenon of attenuation due to the multiple paths taken by a radio wave. A UWB signal can consequently provide good space and time resolutions. Because of its very short duration, a pulse has very fast rising and falling edges, which makes it possible to determine, at a receiving device of the UWB signal, a very precise arrival time of a pulse. It is furthermore possible to distinguish rather clearly the shortest path from the other paths taken by the radio wave. All of this contributes to optimizing an estimation of the geographical position of a device transmitting a UWB signal from the arrival time of said signal.

Figure 2:
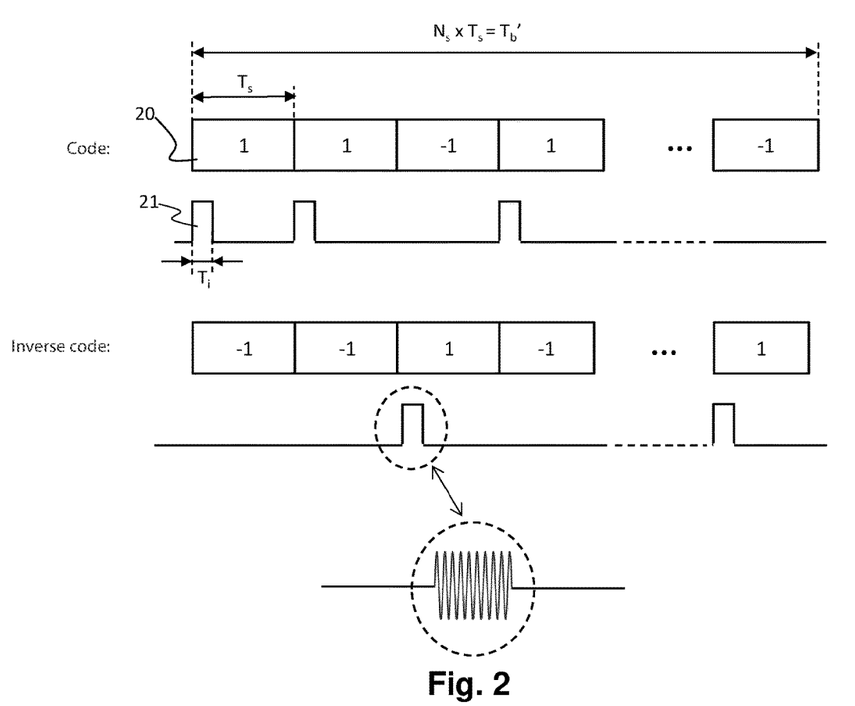
FIG. 2 diagrammatically shows code used to encode a bit of a sequence of bits to be transmitted, as well as the associated signal.

FIG. 2 diagrammatically shows how a UWB signal conventionally transports a bit of a message.

A "Pseudo-Noise Code" (PN Code) that is known both by the transmitting device 11 and by the receiving devices 12 is used to encode each bit of the message.

The code comprises a number $N_s$ of ordered binary symbols 20. Each binary symbol 20 can take two possible states: one state or the contrary state thereof. As a non-limiting example, and such as shown in FIG. 2, a state of a binary symbol 20 is represented by the value 1, and the contrary state thereof is represented by the value −1. A binary symbol 20 in the state represented by the value 1 corresponds for example to a presence of a pulse 21 on the UWB signal. A binary symbol 20 in the state represented by the value −1 corresponds for example to an absence of a pulse 21 on the UWB signal. This is then referred to as On Off Keying (OOK). The duration of a binary symbol 20 is noted as $T_s$. The duration of a pulse 21 is noted as $T_i$.

Such as shown in FIG. 2, each bit of the message is modulated by the code. A bit can take the value 1 or the value 0. If the bit to be transmitted has 1 for value, the bit is encoded by the $N_s$ binary symbols 20 of the code. If the bit to be transmitted has 0 for value, the bit is encoded by the $N_s$ binary symbols 20 of the inverse code. A binary symbol 20 of an inverse code takes a state contrary to the state of the binary symbol 20 of the same rank of the respective non-inverse code.

Such as shown in FIG. 2, a pulse 21 of the UWB signal corresponds to a period of time of duration $T_i$ during which the signal is a sinusoidal carrier of frequency $f_p$, the signal being zero the rest of the time.

In the example considered, the number $N_s$ of binary symbols is equal to 128; the carrier frequency $f_p$ has for value 4 GHz; the duration $T_i$ of a pulse 21 is 2.5 ns; the duration $T_s$ of a binary symbols is 160 ns, which corresponds to a binary symbol transmission frequency $f_s$ of 6.25 MHz. The time Tb to transmit one bit is then equal to $N_s \times T_s$, or 20.480 μs, which corresponds to a bit transmission frequency $f_b$ of about 48.83 kbits/s.

As a receiving device 12 knows the code used by the transmitting device 11 to modulate the bits of the message to be transmitted, the receiving device 12 can, conventionally, decode a message transmitted by the transmitting device 11 by sampling the pulse envelope 21 of the signal transporting said message and by making a correlation between the samples obtained and a reference sequence that is representative of said code modulated by a pulse envelope. A sample takes for example the value 1 for a sampling time comprised in a period $T_i$ of a pulse 21; a sample takes for example the value −1 for a sampling time comprised outside a period $T_i$ of a pulse 21.

The sampling frequency is noted as $f_e$. The time difference between two samples is noted as $T_e$. The number of samples by binary symbol 20 is noted as $N_e$, this number corresponds to the ratio between the sampling frequency $f_e$ and the binary symbol transmission frequency $f_s$. In the example considered, the sampling frequency $f_e$ is 500 MHz and the number $N_e$ of samples per binary symbol is 80. The length of the reference sequence is then 10,240 samples (128×80=10 240). The correlation is carried out on a sliding window of samples of the signal received of which the length is equal to the length of the reference sequence. The length of the reference sequence has a duration of $N_s \times T_s$=20.48 μs.

Note that a value of 500 MHz for the sampling frequency $f_e$ is only an example. Other sampling frequency values can be used, such as for example a sampling at 2 GHz, which then entails a reference sequence of 40960 samples. The higher the sampling frequency $f_e$ is, the lower the detection of a message is, and the higher the precision of the arrival time of said message is.

Figure 3:
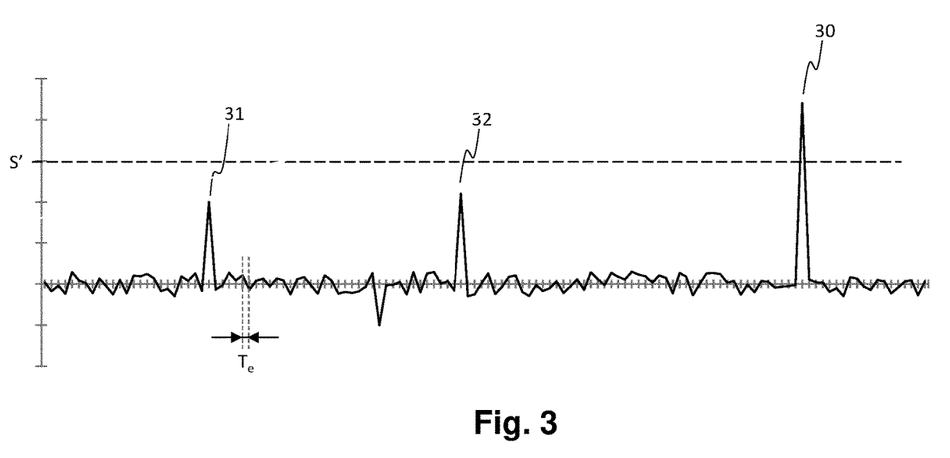
FIG. 3 diagrammatically shows a correlation signal generated by a receiving device from a signal transporting a bit sequence transmitted by a transmitting device.

FIG. 3 diagrammatically shows a correlation signal generated by a receiving device 12 from a signal transporting a message transmitted by a transmitting device 11. The correlation values of the signal are represented on the vertical axis. The sampling times are represented on the horizontal axis. At a given sampling time, the higher the number of samples of the sliding window identical to the samples of the reference sequence is, the higher the correlation value is. A correlation value at a given sampling time is for example calculated by multiplying the value of each sample of the sliding window with the value of the corresponding sample of the reference sequence, and by adding the results obtained for all the samples of the sliding window.

A correlation peak 30 is reached when the correlation value at a sampling time is greater than a predetermined correlation threshold S'. A correlation peak 30 corresponds to the detection of a bit of value 1.

A bit of value 0 can be detected when a correlation value at a sampling time is negative with an absolute value greater than the threshold S'. Alternatively, a bit with the value 0 can be detected by making a correlation of the samples of the signal received with a reference sequence that is representative of the inverse code.

It is suitable to select a level for the threshold S' that is sufficiently high in such a way as to prevent the detection of false correlation peaks 31, 32. It is also suitable however to select a level for the threshold S' that is sufficiently low to prevent missing a detection of a correlation peak 30 (knowing that the signal can be disturbed by interferences during the transmission therefore from the transmitting device 11 to the receiving device 12 and that the maximum possible correlation value is consequently not necessarily reached for each bit of the message). The higher the number $N_s$ of samples of the code is, the easier the detection of a correlation peak 30 will be, because it is then easier to discriminate a correlation peak 30 from a false correlation peak 31, 32. However, increasing the length $N_s$ of the code has the disadvantage of extending the transmission duration of a bit as well as the complexity of the correlation calculations by the receiving device 12. Another disadvantage is that the transmission clock has to be more precise if the length $N_s$ of the code is greater.

The arrival time of a bit at the receiving device 12 corresponds to the detection time of a correlation peak 30. However, as on the one hand the ratio between the sampling frequency $f_e$ and the binary symbol 20 transmission frequency $f_s$ is not necessarily an integer value, and as on the other hand the reception time of the beginning of a binary symbol 20 is not necessarily aligned with a sampling time, the estimation of the arrival time of a bit can have a precision error equal to the time difference $T_e$ between two samples.

Figure 4:
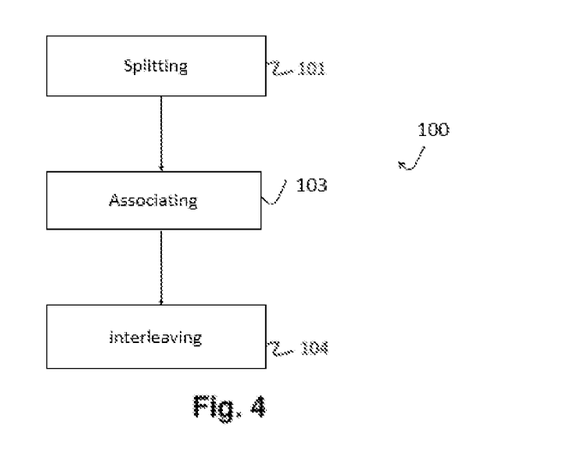
FIG. 4 diagrammatically shows the main steps of a method for transmitting a bit sequence according to the invention.

FIG. 4 diagrammatically shows the main steps of a method 100 for transmitting a bit sequence according to the invention. Such a bit sequence can correspond to a message to be transmitted. Alternatively, a message to be transmitted can correspond to the concatenation of several sequences of bits of the same length. In this case, to transmit the message, it is suitable to execute the method 100 for transmitting a bit sequence according to the invention for each bit sequence that forms the message. As shall be explained in what follows, this method 100 for transmitting a bit sequence aims to improve the transmission speed of the bits of the sequence as well as optimize the detection and the precision of the estimation of the detection time of a correlation peak.

The method 100 for transmitting a bit sequence is implemented by a transmitting device 11. For this purpose, the transmitting device 11 comprises for example a processing circuit (not shown in the figures), comprising one or several processors and means of memorization (for example an electronic memory) wherein a computer program product is memorized, in the form of a set of program code instructions to be executed to implement the various steps of the method 100 for transmitting a bit sequence. Alternatively or as a supplement, the processing circuit comprises one or more programmable logic circuits (FPGA, PLD, etc.), and/or one or more specialized integrated circuits (ASIC), and/or a set of discrete electronic components, etc., suitable for implementing all or a portion of said steps of the method 100 for transmitting a bit sequence.

In other terms, the processing circuit comprises a set of means configured by software (specific computer program product) and/or hardware (FPGA, PLD, ASIC, discrete electronic components, etc.) to implement the steps of the method 100 for transmitting a bit sequence intended for a receiving device 12.

The bit sequence is transmitted at a frequency $f_b$. Prior to implementing the method 100 for transmitting the bit sequence, a set of codes is determined. Each code is associated with a possible value from a block of $N_b$ bits, and each code comprises an ordered set of $N_s$ binary symbols 20 intended to be transmitted at a frequency $f_s$. The method 100 for transmitting comprises:

splitting 101 of the bit sequence into N blocks of $N_b$ bits, said blocks being ordered according to a predetermined order of transmission, the frequency $f_s$ and the numbers N and $N_b$ being selected such that $N_s \times f_b = N \times N_b \times f_s$, associating 103 a code with each of the N blocs of $N_b$ bits according to the value from said blocks, interleaving 104 binary symbols 20 of the N codes corresponding respectively to the N blocks of bits to be transmitted, the interleaved binary symbols 20 being transmitted successively over time with a frequency $f_c$ such that $N \times f_s = f_c$, in such a way that the first binary symbol 20 of the code associated with the first block of bits to be transmitted is transmitted first, followed by the first binary symbol 20 of the code associated with the second block, and so on until the first binary symbol 20 of the code associated with the block of rank N; then the second binary symbol 20 of the code associated with the first block, followed by the second binary symbol 20 of the code associated with the second block, and so on until the second binary symbol 20 of the code associated with the block of rank N; and so on until the binary symbol 20 of rank $N_s$ of the code associated with the first block, followed by the binary symbol 20 of rank $N_s$ associated with the second block, and so on until the binary symbol 20 of rank $N_s$ associated with the block of rank N.

The binary symbols 20 of the N codes corresponding respectively to the N blocks of bits to be transmitted are interleaved in the sense that the transmission starting times of said binary symbols 20 are interleaved. The interleaved binary symbols 20 are successively transmitted with a time shift of value $T_c=1/f_c$.

Figure 5:
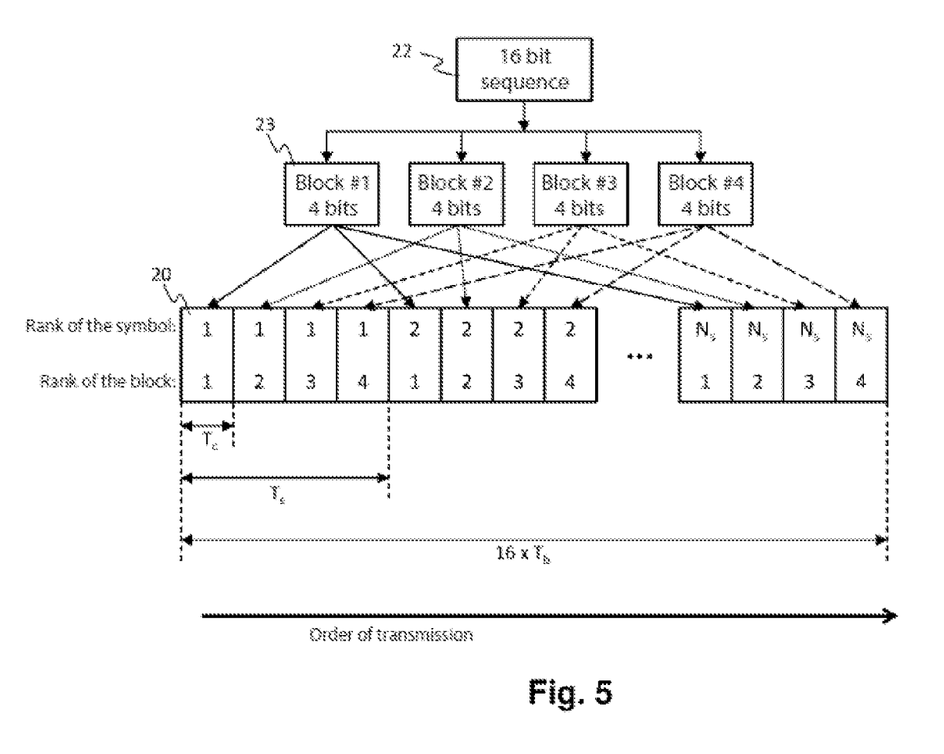
FIG. 5 diagrammatically shows an interleaving of binary symbols forming codes associated respectively with blocks of bits of a sequence of bits to be transmitted.

FIG. 5 diagrammatically shows the method 100 for the transmitting of a sequence 22 of sixteen bits.

The sequence 22 of sixteen bits is split into four blocks 23 each comprising four bits. Thus, in the example considered and shown in FIG. 5, the number N of blocks 23 is 4 (N=4), and the number $N_b$ of bits per block 23 is four ($N_b$=4).

Each block 23 of four bits can take sixteen values ($2^{Nb}$=16). Sixteen different pseudo-noise codes are then determined and associated respectively with the different possible values that a block 23 can take.

In the example considered, a code is a binary sequence of the M-sequence type. Nothing however excludes, according to other examples, having a pseudo-noise sequence of another type such as a so-called "Gold" sequence, or a so-called "Barker" sequence, or a so-called "Hadamard-Walsh" sequence, etc. In the example considered, the number $N_s$ of binary symbols 20 is 128 ($N_s$=128).

The pseudo-noise codes can advantageously be selected in such a way that they have a two-by-two inter-correlation level less than 30% of $N_s$. Such arrangements make it possible in particular to optimize the detection of a correlation peak.

Figure 8:
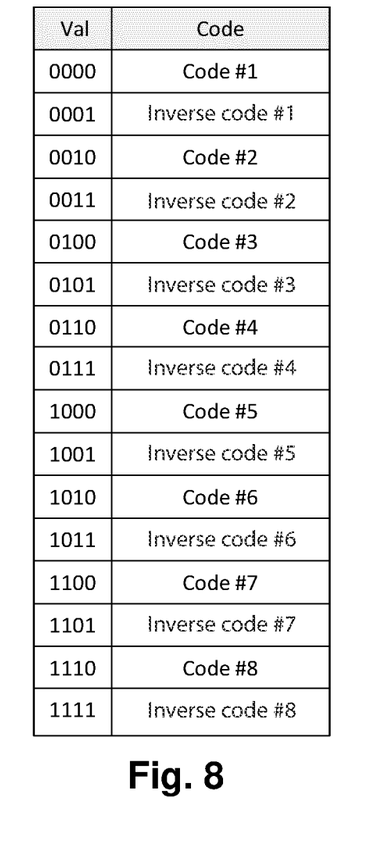
FIG. 8 shows a table showing codes associated with the different values that a block of four bits can take.

Such as shown in FIG. 8, it is also possible to determine $2^{(Nb-1)}$ main codes (i.e. eight main codes in the example considered) as well as the $2^{(Nb-1)}$ respective inverse codes so as to form a set of $2^{Nb}$ codes that correspond to the $2^{Nb}$ possible values from a block 23.

The codes thus determined, as well as the association table between a possible value from the block 23 and a code, are known both by the transmitting device 11 and by the receiving devices 12. FIG. 8 shows such an association table. The first column of this table comprises the sixteen possible values (in binary format) that can be taken by a block 23 of four bits, and the second column of this table comprises the codes associated respectively with each one of these possible values.

The $N_s$ binary symbols 20 of the N codes corresponding respectively to the values of the N blocks 23 of bits of the bit sequence 22 to be transmitted are then interleaved such as shown in FIG. 5.

Each binary symbol 20 shown in FIG. 5 comprises two numbers. The number at the top represents the rank of the binary symbol 20 among the $N_s$ ordered binary symbols 20 of the code that it belongs to. The number at the bottom represents the rank of the block 23 among the N ordered blocks 23 to be transmitted. Thus, a binary symbol 20 for which the pair (rank of the binary symbol, rank of the block) is (1, 1) corresponds to the first binary symbol 20 of the code associated with the value from the first block 23. The binary symbol 20 (1, 2) corresponds to the first binary symbol 20 of the code associated with the value from the second block 23. The binary symbol 20 (1, N) corresponds to the first binary symbol 20 of the code associated with the value from the block 23 of rank N, i.e. the last block 23 of the bit sequence 22 to be transmitted. The binary symbol 20 (2, 1) corresponds to the second binary symbol 20 of the code associated with the value from the first block 23. The binary symbol 20 (2, 2) corresponds to the second binary symbol 20 of the code associated with the value from the second block 23. The binary symbol 20 (2, N) corresponds to the second binary symbol 20 of the code associated with the value of the second block 23. The binary symbol 20 ($N_s$, 1) corresponds to the binary symbol 20 of rank $N_s$, i.e. the last binary symbol 20, of the code associated with the value from the first block 23. The binary symbol 20 ($N_s$, 2) corresponds to the binary symbol 20 of rank $N_s$ of the code associated with the value from the second block 23. The binary symbol 20 ($N_s$, N) corresponds to the last binary symbol 20 of the code associated with the value of the last block 23 to be transmitted.

The binary symbols 20 of the code associated with the value from the first block 23 are then the binary symbols 20 (1, 1), (2, 1), . . . , ($N_s$, 1). The binary symbols 20 of the code associated with the value from the second block 23 are then the binary symbols 20 (1, 2), (2, 2), . . . , ($N_s$, 2). The binary symbols 20 of the code associated with the value from the third block 23 are then the binary symbols 20 (1, 3), (2, 3), . . . , ($N_s$, 3). The binary symbols 20 of the code associated with the value from the last block 23 to be transmitted (i.e. the block 23 of rank N) are then the binary symbols 20 (1, N), (2, N), . . . , ($N_s$, N).

In FIG. 5, the order in which the interleaved binary symbols 20 are transmitted is represented from left to right.

Figure 6:
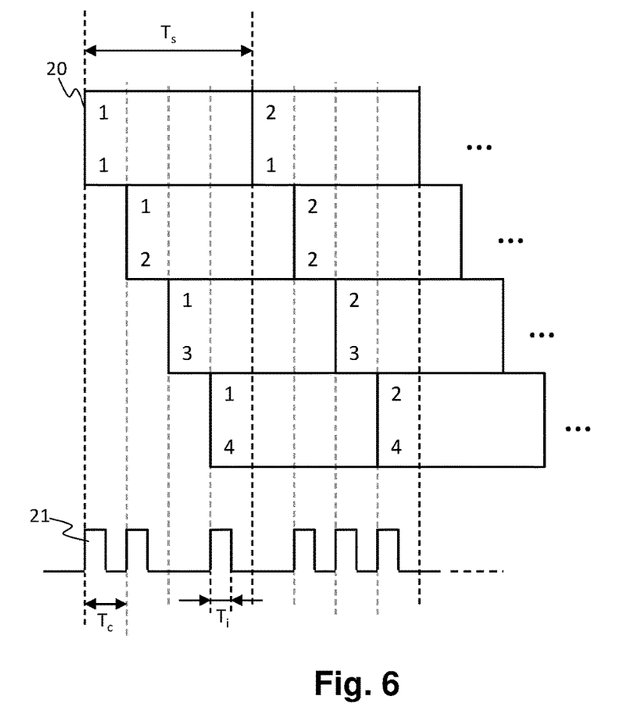
FIG. 6 diagrammatically shows interleaved binary symbols represented in FIG. 5, as well as the associated signal.

The binary symbols 20 that belong to the same code are transmitted at a frequency $f_s$. The duration of a binary symbol 20 is $T_s=1/f_s$. The interleaved binary symbols 20 are transmitted however at a frequency $f_c=N \times f_s$. This means that the time difference between two interleaved binary symbols 20 is $T_c=1/f_c$. In the example considered, the transmission frequency $f_c$ of the interleaved binary symbols 20 is 25 MHz and the time difference $T_c$ between two interleaved binary symbols 20 is 40 ns. FIG. 6 is another diagrammatical representation of the interleaved binary symbols 20 shown in FIG. 5, as well as the associated signal. In the example considered, either a presence of a pulse 21 (if the symbol takes a state represented by the value 1), or an absence of a pulse (if the symbol takes a state represented by the value −1) corresponds to each interleaved binary symbol 20.

It appears in FIG. 6 that the interleaving of the binary symbols 20 is carried out with an overlapping of the binary symbols 20. In particular, the binary symbols having the same symbol rank and different block ranks overlap. For example, and such as shown in FIG. 6, the binary symbols 20 (1, 1), (1, 2), (1, 3) and (1, 4) overlap, i.e. they have a common period of time.

The number N of blocks 23 into which the sequence 22 of bits to be transmitted is split is selected such that the time difference $T_c$ between two interleaved binary symbols 20 is greater than the duration $T_i$ of a pulse 21. Thus, two pulses 21 of two distinct codes cannot overlap. Also, a pulse 21 from one code cannot overlap an absence of a pulse 21 of another code.

It then appears, in FIGS. 5 and 6, that the time required to transmit all the $N \times N_b$ bits of the sequence 22 is equal to $N_s \times T_s$. In other words, the time Tb to transmit a bit from the sequence 22 is equal to:

$$T_b = \frac{N_s}{N_b \times N} \times T_s \quad \text{[Math. 1]}$$

This also means that the bit transmission frequency $f_b$ is ($N_b \times N$) times greater than the bit transmission frequency $f'_b$ of a conventional method such as described in reference to FIGS. 2 and 3. In the example considered, this means that the method 100 for transmitting a bit sequence 22 according to the invention allows for a multiplication by sixteen ($N_b \times N = 16$) of the binary speed for the transmission of a bit sequence 22. The bit transmission frequency $f_b$ is then 781.25 kb/s.

In the example considered, the time required to transmit a bit sequence 22 is thus divided by sixteen with respect to a conventional method such as described in reference to FIGS. 2 and 3. In the example considered, the time for transmitting a message comprising an identifier of ninety-six bits formed by four sequences 22 of sixteen bits is approximately 123 μs. The time required to send such a message comprising an identifier of ninety-six bits with a method such as described in reference to FIGS. 2 and 3 is approximately equal to 2 ms. The method 100 according to the invention thus makes it possible to substantially reduce the time during which the transmitting device 11 has to be active in order to transmit the message. Furthermore, the number of pulses 21 to be generated to encode a message is also divided on the average by the number $N_b$ of bits that a block 22 comprises (i.e. a division by four in the example considered). All of this contributes to drastically limiting the electrical consumption of the transmitting device 11 during the transmission of a message.

Another advantage resulting from the reduction in the transmission time of a message by a transmitting device 11 is a reduction in the noise for the global system. Indeed, two messages transmitted at random times by two transmitting devices 11 of the system 10 for geolocating have a lower probability of being transmitted at the same time if the transmission time of a message is shorter. The interferences caused by simultaneous transmissions of messages are then decreased.

A receiving device 12 knows the order of transmission of the N blocks 23 of a sequence 22 of bits transmitted by a transmitting device 11, as well as the codes used and the association table of said codes with the different possible values from a block 23.

The receiving device 12 is then capable of decoding a bit sequence 22 transmitted by a transmitting device 11 by sampling the pulse envelope 21 of the signal transporting said bit sequence 22 and by making, for each one of the $2^{Nb}$ codes used, a correlation between the samples obtained and a reference sequence that is representative of said code modulated by a pulse envelope. In the example considered, a sample takes the value 1 for a sampling time comprised in a period $T_i$ of a pulse 21; a sample takes the value −1 for a sampling time comprised outside a period $T_i$ of a pulse 21.

The sampling frequency is noted as $f_e$. The time difference between two samples is noted as $T_e$. The number of samples by binary symbol 20 is noted as $N_e$, this number corresponds to the ratio between the sampling frequency $f_e$ and the binary symbol 20 transmission frequency $f_s$. In the example considered, the sampling frequency $f_e$ is 500 MHz and the number $N_e$ of samples per binary symbol 20 is 80. The length of the reference sequence of a code is then 10,240 samples.

Each one of the $2^{Nb}$ correlations are carried out on a sliding window of samples of the signal received of which the length is equal to the length of the reference sequence.

At a given sampling time, the higher the number of samples of the sliding window identical to the samples of the reference sequence of a code is, the higher the correlation value is for this code. A correlation value for a given code at a given sampling time is for example calculated by multiplying the value of each sample of the sliding window with the value of the corresponding sample of the reference sequence of said code, and by adding the results obtained for all the samples of the sliding window.

To each sampling time thus corresponds $2^{Nb}$ correlation values. It is then possible to generate a correlation signal that represents at each sampling time the greatest correlation value among the $2^{Nb}$ correlation values calculated for the $2^{Nb}$ codes. It should be noted that it is not necessary to de-interleave the binary symbols 20 received before carrying out the correlations.

Figure 7:
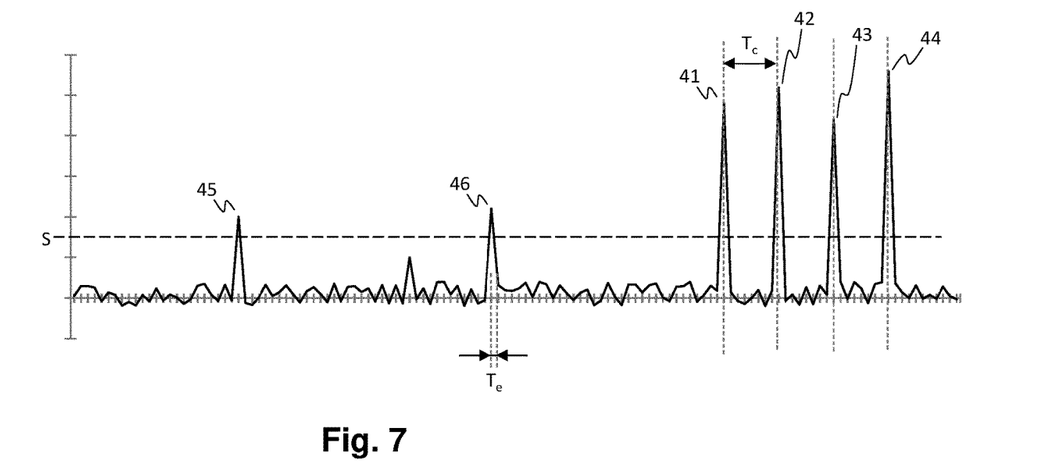
FIG. 7 diagrammatically shows a correlation signal generated by a receiving device from a signal transporting a bit sequence transmitted according to the method for transmitting according to the invention.

FIG. 7 diagrammatically shows such a correlation signal generated by a receiving device 12 from a signal transporting a bit sequence 22 transmitted by a transmitting device 11. The correlation values of the signal are represented on the vertical axis. The sampling times are represented on the horizontal axis.

It then appears that a sequence 22 of ($N \times N_b$) bits can be detected by the presence of N successive correlation peaks 41, 42, 43, 44 spaced by a time difference approximately equal to $T_c$. Each correlation peak 41, 42, 43, 44 corresponds to one of the N blocks 23 into which the bit sequence 22 was split. A correlation peak 41, 42, 43, 44 is reached for example when the correlation value at a sampling time is greater than a predetermined correlation threshold S.

It also appears that the level of the correlation threshold S can take a value that is clearly lower than the level of the correlation threshold S' for a conventional method such as described in reference to FIGS. 2 and 3. Indeed, even if certain sampling times have correlation values that are higher than the correlation threshold S, as is the case for example for the false correlation peaks 45, 46 shown in FIG. 7, a correlation peak will not be detected for these sampling times because there is no presence of N successive correlation peaks 41, 42, 43, 44 separated by a time difference approximately equal to $T_c$ for these sampling times.

Note that the time difference between two successive peaks among the N correlation peaks 41, 42, 43, 44 is not necessarily exactly equal to $T_c$. Indeed, the ratio between the sampling frequency $f_e$ and the binary symbol 20 transmission frequency $f_s$ is not necessarily an integer value. Furthermore, the reception time of the beginning of a binary symbol 20 is not necessarily aligned with a sampling time. In the example considered, where the ratio between $f_e$ and $f_s$ is an integer value, it is however possible to consider that the time difference between two successive peaks among the N correlation peaks 41, 42, 43, 44 is comprised between $(T_c - T_e)$ and $(T_c + T_e)$.

A receiving device 12 can then advantageously implement a method for estimating the arrival time of a bit sequence 22 transmitted by a transmitting device 11 wherein the arrival time of the bit sequence is determined according to the N respective detection times of N correlation peaks 41, 42, 43, 44 of the N different blocks 23 of bits transmitted. If the bit sequence 22 corresponds to a message, the arrival time of the message corresponds to the arrival time of the bit sequence 22. If a message corresponds to several concatenated sequences 22 of bits, the arrival time of the message corresponds to the arrival time of the first sequence 22 of bits.

The receiving device 12 comprises for example a processing circuit (not shown in the figures), comprising one or several processors and means of memorization (for example an electronic memory) wherein a computer program product is memorized, in the form of a set of program code instructions to be executed to implement the various steps of the method of estimating the arrival time of a bit sequence 22. Alternatively or as a supplement, the processing circuit comprises one or more programmable logic circuits (FPGA, PLD, etc.), and/or one or more specialized integrated circuits (ASIC), and/or a set of discrete electronic components, etc., suitable for implementing all or a portion of said steps of the method of estimating the arrival time of a bit sequence 22.

In other terms, the processing circuit comprises a set of means configured by software (specific computer program product) and/or hardware (FPGA, PLD, ASIC, discrete electronic components, etc.) to implement the steps of the method of estimating the arrival time of a bit sequence 22 transmitted by a transmitting device 11.

For example, the estimation of the arrival time of the bit sequence 22 can be determined by averaging the number of samples separating two successive peaks among the N correlation peaks 41, 42, 43, 44. If this calculated average number is greater than the expected theoretical difference which is $N_e/N$, then this means that the arrival time of the bit sequence 22 is later than the sampling time corresponding to the first correlation peak 41. Inversely, if this calculated average number is less than the expected theoretical difference which is $N_e/N$, then this means that the arrival time of the bit sequence 22 precedes the sampling corresponding to the first correlation peak 41. It is then for example possible to offset the estimated arrival time of the bit sequence 22 by a value $T_e/(N-1)$ before or after the sampling instant of the first correlation peak 41 among the N correlation peaks 41, 42, 43, 44 detected. The estimation of the arrival time of a bit sequence 22 is then more precise than that described in reference to FIG. 3.

The set of $2^{Nb}$ codes can advantageously include $2^{(Nb-1)}$ main codes (i.e. eight main codes in the example considered) as well as their $2^{(Nb-1)}$ respective inverse codes. This can indeed advantageously make it possible to make do with making the correlations for the $2^{(Nb-1)}$ main codes and to thus divide by two the number of correlations to be carried out at each sampling time. It is suitable in this case to consider at each sampling the correlation value that is the highest in absolute value among the $2^{(Nb-1)}$ correlation values calculated for the different main codes. If this value is positive, this means that the calculated correlation value potentially corresponds to the detection of a block 23 of which the value is that associated with the main code used for this correlation calculation. If this value is negative, this means that the calculated correlation value potentially corresponds to the detection of a block 23 of which the value is that associated with the inverse code of the main code used for this correlation calculation.

When N successive correlation peaks 41, 42, 43, 44 separated by a time difference approximately equal to $T_e$ (with a precision of $+/-T_e$) are detected by the receiving device 12, it is then possible to reconstruct the bit sequence 22 transmitted by the transmitting device 11. Indeed, each one of the N successive peaks 41, 42, 43, 44 corresponds respectively to a block 23 of $N_b$ bits of which the value is that associated with the code used for the corresponding correlation calculation (or possibly the inverse code of the code used for this correlation calculation). As the receiving device 12 knows in what order the blocks 23 of a bit sequence 22 corresponding to a message are transmitted, it is possible for the receiving device 12 to reconstruct the bit sequence 22 transmitted by the transmitting device 11. If a message is formed by several bit sequences 22, the receiving device 12 can reconstruct the message by concatenating the different bit sequences 22 obtained.

In particular embodiments of the method 100 for transmitting a bit sequence 22, the inverse code to the code normally associated with the value from a block 23 of bits is used to encode at least one predetermined block of bits 23 of the sequence 22 of bits to be transmitted.

Figure 9:
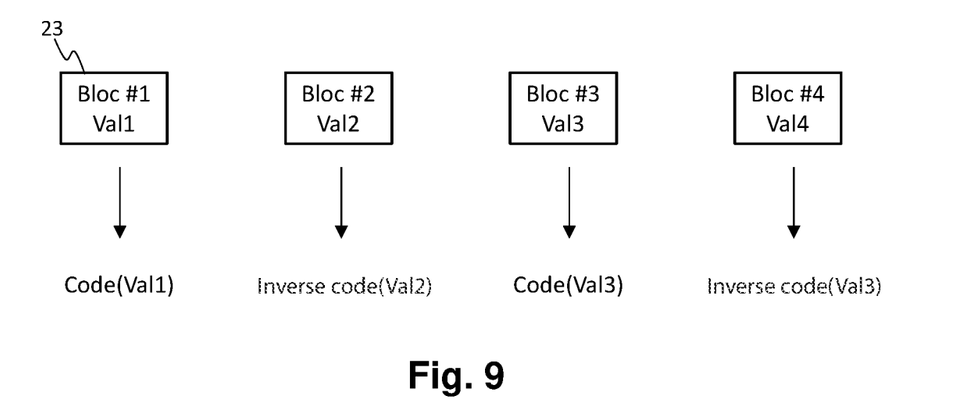
FIG. 9 diagrammatically shows a particular embodiment of the method for transmitting a bit sequence according to the invention.

In a preferred embodiment of the method 100 for transmitting, and such as shown in FIG. 9, the inverse code is used in place of the code normally associated with the value from a block 23 of bits for one block 23 of bits out of two of the sequence 22 of bits to be transmitted.

In the example shown in FIG. 9, there are four blocks 23 to be transmitted. Each block 23 comprises four bits. The code used to encode the first block 23 (Block #1) having for value Vai1 is the code of the association table shown in FIG. 8 associated with the value Val1. The code used to encode the second block 23 (Block #2) having for value Val2 is the inverse code to the code associated with the value Val2. The code used to encode the third block 23 (Block #3) having for value Val3 is the code associated with the value Val3. The code used to encode the fourth block 23 (Block #4) having for value Val4 is the inverse code to the code associated with the value Val4.

Such arrangements make it possible in particular to reduce the symmetry of the binary symbols 20 transmitted when several blocks 23 that have the same value have to be transmitted successively. This is the case for example when several blocks 23 have zero for value. Rather than encode all the successive blocks 23 of which the value is zero with the same single code, one block 23 out of two will be encoded with the code associated with the zero value, and one block 23 out of two will be encoded with the inverse code to the code associated with the zero value.

Limiting the symmetry of the binary symbols 20 transmitted advantageously makes it possible to prevent generating "rays" in the spectrum. The sensitivity to noise is then improved and the transmission power permitted is increased.

The description hereinabove clearly illustrates that, through its different characteristics and the advantages thereof, the present invention achieves the objectives set.

In particular, and such as was demonstrated in the description hereinabove, the method 100 for transmitting a bit sequence 22 according to the invention allows for a multiplication of the transmission speed by the number $N_b$ of bits comprised in a block 23 and by the number N of blocks 23 into which the bit sequence 22 is split. The speed is thus multiplied by $N_b \times N$ with respect to a conventional method of transmitting such as described in reference to FIGS. 2 and 3.

The tile required to transmit a message corresponding to a sequence 22 of bits or to several sequences 22 of bits of the same length is then reduced by as much. This means that the period of time during which a transmitting device 11 must be in an active mode to transmit a message is also reduced by a factor equal to $N_b \times N$.

Furthermore, the number of pulses 21 necessary to encode a message is divided on the average by the number $N_b$ of bits comprised in a block 23.

All of this contributes to drastically limiting the electrical consumption of the transmitting device 11 during a message.

Another advantage resulting from the reduction in the transmission time of a message by a transmitting device 11 is a reduction in the noise for the global system. Indeed, two messages transmitted at random times by two transmitting devices 11 of the system 10 for geolocating have a lower probability of being transmitted at the same time if the transmission time of a message is shorted. The interferences caused by simultaneous transmissions of messages are then decreased.

Transmitting a bit sequence 22 according to a method 100 for transmitting according to the invention makes it possible furthermore to optimize, at the receiving device 12, the detection and the precision of the estimation of the detection time of a correlation peak.

It was indeed demonstrated in the description hereinabove that the discrimination between a true correlation peak 41, 42, 43, 44 and a false correlation peak 45, 46 is facilitated by the presence, at the arrival of a bit sequence 22 transmitted by a transmitting device 11 and received by a receiving device 12, of N consecutive correlation peaks 41, 42, 43, 44 spaced by a time difference close to the time difference $T_e$ separating two interleaved binary symbols 20. The level of the correlation threshold S can then take a value that is clearly lower than the level of the correlation threshold S' for a conventional method such as described in reference to FIGS. 2 and 3.

The sensitivity of the correlator of the receiving device 12 is improved, as if the receiving device 12 was virtually using binary symbol 20 codes of length N×$N_s$ (instead of binary symbol 20 codes of length $N_s$). The greater the length of a code is, the more discriminant the value of a correlation peak is with respect to an average value of a correlation signal.

Splitting 101 a sequence 22 into N blocs 23 of $N_b$ bits and the interleaving 104 of the binary symbols 20 of the codes corresponding respectively to said N blocks 23 makes it possible to limit the number of codes to be used and the number of correlation calculations to be carried out at the receiving device 12. Indeed, as was explained hereinabove, to decode a sequence 22 of bits transmitted with the method 100 for transmitting according to the invention, it can suffice, at a receiving device 12, to make correlations for $2^{(Nb-1)}$ codes. On the other hand, with a method without splitting or interleaving, it would be necessary to determine $2^{N \times Nb}$ codes having satisfactory inter-correlation levels and carry out $2^{N \times Nb}$ correlations to decode the bit sequence 22. In the example considered where N=$N_b$=4, the invention makes it possible to make do with eight codes and eight correlation calculations at each sampling time, although it would be necessary to use 32,768 codes and as many correlation calculations at each sampling time for method without splitting or interleaving.

A receiving device 12 can furthermore advantageously implement a method for estimating the arrival time of a bit sequence 22 transmitted by a transmitting device 11 wherein the arrival time of the bit sequence 22 is determined according to the N respective detection times of N correlation peaks 41, 42, 43, 44 of the N different blocks 23 of bits transmitted. The estimation of the arrival time of a bit sequence 22 is then more precise than that described in reference to FIG. 3.

More generally, it is to be noted that the embodiments considered hereinabove were described as non-limiting examples, and that other alternatives can consequently be considered.

The invention was described by considering a system 10 for geolocating a transmitting device 11 based on calculations of difference in arrival times of a message transmitted by said transmitter 11 and received by receiving devices 12. Nothing however excludes the invention from being able to be applied to other systems. In particular, the method 100 for transmitting a message according to the invention is of interest when it is advantageous to increase the bit transmission speed by a transmitting device 11.

The invention was also described by considering that a message transmitted by a transmitting device 11 is transported by an ultra wide band radio signal of the "on off" type (with a binary symbol 20 being represented by the presence or the absence of a pulse 21). However, nothing excludes the invention from being able to be applied to other types of modulation, such as for example a time-shift modulation, flip modulation, etc. Also, nothing excludes the invention from being able to be applied to other types of signals, in particular signals of which the bandwidth is lower, or to other modulations, such as for example amplitude, frequency or phase modulations.

The invention claimed is:

1. A method for transmitting a bit sequence by an ultra wide band signal, the method comprising:

splitting the bit sequence into N ordered blocks of $N_b$ bits;

associating each of the N ordered blocs $B_i$ of respective rank i with i=1 to N (i being an integer), with one of a set of N codes $C_i$, each code $C_i$ comprising $N_s$ ordered binary symbols $S_{i,j}$ of respective rank j with j=1 to $N_s$ (j being an integer), each one of the ordered binary symbols $S_{i,j}$ being in one of two contrary states comprising a first state corresponding to a presence of a pulse in the ultra wide band signal and a second state corresponding to an absence of pulse in the wide band signal;

interleaving, in the N ordered blocks, the ordered binary symbols $S_{i,j}$ of the set of N codes $C_i$ to obtain a sequence of interleaved ordered binary symbols such that, in said sequence of interleaved ordered binary symbols, the ordered binary symbols $S_{i,j}$ are successively positioned by carrying out the following steps:

step a) for each rank j starting with j=1, i is first incremented from 1 to N, then step b) repeating step a) by incrementing j by one until j=Ns, and transmitting the interleaved ordered binary symbols successively over time at a frequency $f_c$.

2. The method according to claim 1, wherein associating each of the N blocs $B_i$ with i=1 to N with one of a set of N codes $C_i$ comprises:

associating each of the N ordered blocks B with a respective code of a set of $2^{Nb}$ codes of a set of $N_s$ ordered binary symbols, and for at least one code associated with the N ordered blocks $B_i$, replacing said at least one code with an inverse code of said at least one code.

3. The method according to claim 1, wherein associating each of the N blocs $B_i$ with i=1 to N with one of a set of N codes $C_i$ comprises:

associating each of the N ordered blocks B with a respective code of a set of $2^{Nb}$ codes of a set of $N_s$ ordered binary symbols, and for each code of every other code associated with the N ordered blocks, replacing said code with an inverse code of said code.

4. A transmitting device comprising a processor, a memory and an antenna, the memory being coded with code instructions executable by the processor for transmitting a bit sequence by an ultra wide band signal, the code instructions comprising instructions for:

splitting the bit sequence into N ordered blocks of $N_b$ bits;
associating each of the N ordered blocs $B_i$ of respective rank i with i=1 to N (i being an integer), with one of a set of N codes $C_i$, each code $C_i$ comprising $N_s$ ordered binary symbols $S_{i,j}$ of respective rank j with j=1 to $N_s$ (j being an integer), each one of the ordered binary symbols $S_{i,j}$ being in one of two contrary states comprising a first state corresponding to a presence of a pulse in the ultra wide band signal and a second state corresponding to an absence of pulse in the wide band signal;
interleaving, in the N ordered blocks, the ordered binary symbols $S_{i,j}$ of the set of N codes $C_i$ to obtain a sequence of interleaved ordered binary symbols such that, in said sequence of interleaved ordered binary symbols, the ordered binary symbols $S_{i,j}$ are successively positioned by carrying out the following steps:
step a) for each rank j starting with j=1, i is first incremented from 1 to N, then
step b) repeating step a) by incrementing j by one until j=Ns, and
causing the antenna to transmit the interleaved ordered binary symbols successively over time at a frequency $f_c$.

5. A method for estimating the arrival time of a bit sequence of an ultra wide band signal, the bit sequence being transmitted by
splitting the bit sequence into N ordered blocks of $N_b$ bits;
associating each of the N ordered blocs $B_i$ of respective rank i with i=1 to N (i being an integer), with one of a set of N codes $C_i$, each code $C_i$ comprising $N_s$ ordered binary symbols $S_{i,j}$ of respective rank j with j=1 to $N_s$ (j being an integer), each one of the ordered binary symbols $S_{i,j}$ being in one of two contrary states comprising a first state corresponding to a presence of a pulse in the ultra wide band signal and a second state corresponding to an absence of pulse in the wide band signal;
interleaving, in the N ordered blocks, the ordered binary symbols $S_{i,j}$ of the set of N codes $C_i$ to obtain a sequence of interleaved ordered binary symbols such that, in said sequence of interleaved ordered binary symbols, the ordered binary symbols $S_{i,j}$ are successively positioned by carrying out the following steps
step a) for each rank j starting with j=1, i is first incremented from 1 to N, then
step b) repeating step a) by incrementing j by one until j=Ns,
the interleaved ordered binary symbols being transmitted successively over time at a frequency $f_c$,
the method comprising:
receiving said bit sequence including said interleaved ordered binary symbols;
for each code of a set of $2^{Nb}$ codes of a set of $N_s$ ordered binary symbols, carrying out a correlation calculation between the ultra wide band signal and a reference signal representative of said code, and
determining the arrival time of the bit sequence using N respective detection times of N correlation peaks corresponding to the N ordered blocks $B_i$, i=1.

* * * * *